United States Patent
Gupta et al.

(10) Patent No.: US 9,622,042 B2
(45) Date of Patent: *Apr. 11, 2017

(54) METHODS AND APPARATUSES FOR MOBILE STATION CENTRIC DETERMINATION OF POSITIONING ASSISTANCE DATA

(71) Applicant: Qualcomm Incorporated, San Diego, CA (US)

(72) Inventors: Rajarshi Gupta, Sunnyvale, CA (US); Lionel Jacques Garin, Palo Alto, CA (US); Behrooz Khorashadi, Mountain View, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/596,039

(22) Filed: Jan. 13, 2015

(65) Prior Publication Data

US 2015/0126229 A1    May 7, 2015

Related U.S. Application Data

(63) Continuation of application No. 13/191,233, filed on Jul. 26, 2011, now Pat. No. 9,148,763.

(Continued)

(51) Int. Cl.
*H04W 4/02* (2009.01)
*H04W 4/04* (2009.01)
(Continued)

(52) U.S. Cl.
CPC .......... *H04W 4/028* (2013.01); *G01C 21/206* (2013.01); *G01S 5/0236* (2013.01); *G01S 5/0252* (2013.01);
(Continued)

(58) Field of Classification Search
CPC ....... H04W 4/043; H04W 4/04; H04W 64/00; H04W 12/04; H04W 4/028
(Continued)

(56) References Cited

U.S. PATENT DOCUMENTS 6,336,073 B1   1/2002   Ihara et al.
7,039,421 B2   5/2006   Couronne et al.
(Continued)

FOREIGN PATENT DOCUMENTS

CN    1703627 A    11/2005
CN    101578626 A   11/2009
(Continued)

OTHER PUBLICATIONS

Beal J.R. Jr., et al., "Contextual Geolocation: A Specialized Application for Improving Indoor Location Awareness in Wireless Local Area Networks," College of Graduate Studies and Research, Minnesota State University, Mankato, MN, 2003, 17 pages.

(Continued)

*Primary Examiner* — Joseph Arevalo
(74) *Attorney, Agent, or Firm* — Berkeley Law & Technology Group, LLP

(57) ABSTRACT

Methods and apparatuses are provided which may be implemented in various devices to generate positioning assistance data and/or the like by mobile station with regard to at least one of a plurality of different indoor regions.

26 Claims, 5 Drawing Sheets

Related U.S. Application Data

(60) Provisional application No. 61/369,548, filed on Jul. 30, 2010.

(51) Int. Cl.
*G01C 21/20* (2006.01)
*G01S 5/02* (2010.01)
*H04W 64/00* (2009.01)

(52) U.S. Cl.
CPC ............ *H04W 4/04* (2013.01); *H04W 4/043* (2013.01); *H04W 64/00* (2013.01)

(58) Field of Classification Search
USPC ........ 455/456.2, 456.1, 456.3, 466; 370/466, 370/419, 474, 254, 343, 252
See application file for complete search history.

(56) References Cited

U.S. PATENT DOCUMENTS

| | | |
|---|---|---|
| 7,424,532 B1 | 9/2008 | Subbiah |
| 7,751,971 B2 | 7/2010 | Chang et al. |
| 8,164,444 B2 | 4/2012 | Anderson et al. |
| 8,818,401 B2 | 8/2014 | Gupta et al. |
| 8,892,118 B2 | 11/2014 | Garin et al. |
| 2002/0164952 A1 | 11/2002 | Singhal et al. |
| 2002/0171581 A1 | 11/2002 | Sheynblat et al. |
| 2003/0011467 A1 | 1/2003 | Suomela |
| 2003/0236618 A1 | 12/2003 | Kamikawa et al. |
| 2005/0204057 A1 | 9/2005 | Anderson et al. |
| 2005/0271072 A1 | 12/2005 | Anderson et al. |
| 2006/0010237 A1 | 1/2006 | Banatre et al. |
| 2006/0034326 A1 | 2/2006 | Anderson et al. |
| 2006/0087425 A1 | 4/2006 | Haeberlen et al. |
| 2006/0142027 A1 | 6/2006 | Krishnamurthi et al. |
| 2006/0212561 A1 | 9/2006 | Feng |
| 2007/0001950 A1 | 1/2007 | Zhang et al. |
| 2007/0116453 A1 | 5/2007 | Uchiyama |
| 2007/0139411 A1 | 6/2007 | Jawerth et al. |
| 2007/0184845 A1 | 8/2007 | Troncoso |
| 2007/0201421 A1 | 8/2007 | Huseth |
| 2008/0010262 A1* | 1/2008 | Frank ............... G06F 17/30241 |
| 2008/0010273 A1* | 1/2008 | Frank ............... G06F 17/30241 |
| 2008/0133124 A1 | 6/2008 | Sarkeshik |
| 2009/0043502 A1 | 2/2009 | Shaffer et al. |
| 2009/0171571 A1 | 7/2009 | Son et al. |
| 2009/0174600 A1 | 7/2009 | Mazlum et al. |
| 2009/0216438 A1* | 8/2009 | Shafer ............... G01C 21/20 701/414 |
| 2009/0271271 A1 | 10/2009 | Johnson |
| 2009/0296600 A1* | 12/2009 | Canright ............. H04L 41/12 370/254 |
| 2010/0036717 A1 | 2/2010 | Trest |
| 2010/0048163 A1 | 2/2010 | Parr et al. |
| 2010/0118025 A1* | 5/2010 | Smith ............... G06Q 30/02 345/418 |
| 2010/0120450 A1 | 5/2010 | Herz |
| 2010/0127883 A1 | 5/2010 | Chou |
| 2010/0151882 A1 | 6/2010 | Gillies et al. |
| 2010/0156713 A1 | 6/2010 | Harper |
| 2010/0157848 A1 | 6/2010 | Das et al. |
| 2010/0217723 A1 | 8/2010 | Sauerwein, Jr. et al. |
| 2010/0225740 A1 | 9/2010 | Jung et al. |
| 2010/0248742 A1 | 9/2010 | Song et al. |
| 2010/0287178 A1* | 11/2010 | Lambert ............. G06Q 30/02 707/765 |
| 2011/0034184 A1 | 2/2011 | Rothschild |
| 2011/0081919 A1 | 4/2011 | Das et al. |
| 2011/0087431 A1 | 4/2011 | Gupta et al. |
| 2011/0090123 A1 | 4/2011 | Sridhara et al. |
| 2011/0116453 A1 | 5/2011 | Huang et al. |
| 2011/0138064 A1 | 6/2011 | Rieger et al. |
| 2011/0173565 A1 | 7/2011 | Ofek et al. |
| 2011/0178703 A1 | 7/2011 | Aben et al. |
| 2011/0244887 A1 | 10/2011 | Dupray et al. |
| 2011/0248887 A1 | 10/2011 | Whelan et al. |
| 2011/0250904 A1 | 10/2011 | Valletta et al. |
| 2011/0274000 A1 | 11/2011 | King et al. |
| 2011/0282947 A1 | 11/2011 | Dodson |
| 2011/0285591 A1 | 11/2011 | Wong |
| 2012/0028654 A1 | 2/2012 | Gupta et al. |
| 2012/0029817 A1 | 2/2012 | Khorashadi et al. |
| 2012/0190386 A1 | 7/2012 | Anderson |
| 2014/0315575 A1 | 10/2014 | Gupta et al. |
| 2014/0315580 A1 | 10/2014 | Gupta et al. |
| 2014/0315581 A1 | 10/2014 | Gupta et al. |
| 2014/0335892 A1 | 11/2014 | Garin et al. |
| 2015/0338218 A1 | 11/2015 | Garin |

FOREIGN PATENT DOCUMENTS

| | | |
|---|---|---|
| CN | 101754363 A | 6/2010 |
| EP | 1736792 A1 | 12/2006 |
| JP | 2001358850 A | 12/2001 |
| JP | 2002296064 A | 10/2002 |
| JP | 2003161772 A | 6/2003 |
| JP | 2003264494 A | 9/2003 |
| JP | 2004048289 A | 2/2004 |
| JP | 2004350088 A | 12/2004 |
| JP | 2005070115 A | 3/2005 |
| JP | 2006502396 A | 1/2006 |
| JP | 2006108959 A | 4/2006 |
| JP | 2006253888 A | 9/2006 |
| JP | 2007066290 A | 3/2007 |
| JP | 2008033043 A | 2/2008 |
| JP | 2008112256 A | 5/2008 |
| JP | 2008537102 A | 9/2008 |
| JP | 2009020070 A | 1/2009 |
| JP | 2009055138 A | 3/2009 |
| JP | 2009545922 A | 12/2009 |
| JP | 2010159980 A | 7/2010 |
| JP | 2010164434 A | 7/2010 |
| KR | 20050057626 A | 6/2005 |
| WO | WO-2004034081 A1 | 4/2004 |
| WO | WO-2008019094 A2 | 2/2008 |
| WO | WO-2008064535 A1 | 6/2008 |
| WO | WO-2009071394 A1 | 6/2009 |
| WO | WO-2010022797 A1 | 3/2010 |
| WO | WO-2010052531 A1 | 5/2010 |
| WO | WO-2010059934 A2 | 5/2010 |
| WO | WO-2010075341 A1 | 7/2010 |
| WO | WO-2012015906 A1 | 2/2012 |

OTHER PUBLICATIONS

International Search Report and Written Opinion—PCT/US2011/045516, ISA/EPO—Nov. 3, 2011.
MIU, Design and Implementation of an Indoor Mobile Navigation System, Master of Science Thesis, Massachusetts Institute of Technology, pp. 1-60, Cambridge, Massachusetts, 2002.
European Search Report—EP15193280—Search Authority—Munich—Jan. 29, 2016.

* cited by examiner

METHODS AND APPARATUSES FOR MOBILE STATION CENTRIC DETERMINATION OF POSITIONING ASSISTANCE DATA

This application is a continuation of pending U.S. patent application Ser. No. 13/191,233, filed Jul. 26, 2011, titled "METHODS AND APPARATUSES FOR MOBILE STATION CENTRIC DETERMINATION OF POSITIONING ASSISTANCE DATA," which claims the benefit of U.S. Provisional Application Ser. No. 61/369,548, filed Jul. 30, 2010, titled, "MOBILE-SERVER ARCHITECTURE OPTIONS", both of which are assigned to the assignee hereof and incorporated in their entirety herein by reference.

BACKGROUND

1. Field

The subject matter disclosed herein relates to electronic devices, and more particularly to methods and apparatuses for use in various devices comprising computing platforms to provide or apply positioning assistance data.

2. Information

The Global Positioning System (GPS) represents one type of Global Navigation Satellite System (GNSS), which along with other types of satellite positioning systems (SPS) provide or otherwise support signal-based position location capabilities (e.g., navigation functions) in mobile stations, and particularly in outdoor environments. However, since some satellite signals may not be reliably received and/or acquired by a mobile station within an indoor environment or other like mixed indoor/outdoor environments, different techniques may be employed to enable position location services.

For example, mobile stations may attempt to obtain a position fix by measuring ranges to three or more terrestrial transmitters (e.g., wireless access points, beacons, cell towers, etc.) which are positioned at known locations. Such ranges may be measured, for example, by obtaining a MAC ID address from signals received from such transmitters and obtaining range measurements to the transmitters by measuring one or more characteristics of signals received from such transmitters such as, for example, signal strength, a round trip delay time, etc.

SUMMARY

In one particular implementation, a method is performed at a mobile station comprising: transmitting a request to a communication network for a first repository device to at least one of one or more identifiers; receiving a description or characterization of an environment of at least a portion of a region including a rough location of the mobile station in response to the request; and generating positioning assistance data at the mobile device for use in providing a location-based service at the mobile station based, at least in part, on the received description or characterization.

In another sample implementation, a mobile station comprises: a network interface; and a processor to: initiate transmission of a request through said network interface to a first repository device according to at least one of one or more identifiers; obtain a description or characterization of an environment of at least a portion of a region including a rough location of the mobile station received from said network interface in response to the request; and generate positioning assistance data for use in providing a location-based service at the mobile station based, at least in part, on the obtained description or characterization.

In another sample implementation, an article comprises a non-transitory storage medium having machine-readable instructions stored thereon which are executable by a special purpose computing apparatus to: initiate transmission of a request from the mobile station to a first repository device according to at least one of one or more identifiers; obtain a description or characterization of an environment of at least a portion of a region including the rough location received at the mobile station in response to the request; and generate positioning assistance data at the mobile device for use in providing a location-based service at the mobile station based, at least in part, on the obtained description or characterization.

In yet another implementation, an apparatus comprises: means for transmitting a request to a communication network for a first repository device according to at least one of one or more identifiers; means for receiving a description or characterization of an environment of at least a portion of a region including a rough location of the mobile station in response to the request; and means for generating positioning assistance data at the mobile device for use in providing a location-based service at the mobile station based, at least in part, on the received description or characterization.

BRIEF DESCRIPTION OF DRAWINGS

Non-limiting and non-exhaustive aspects are described with reference to the following figures, wherein like reference numerals refer to like parts throughout the various figures unless otherwise specified.

DETAILED DESCRIPTION

Figure 1:
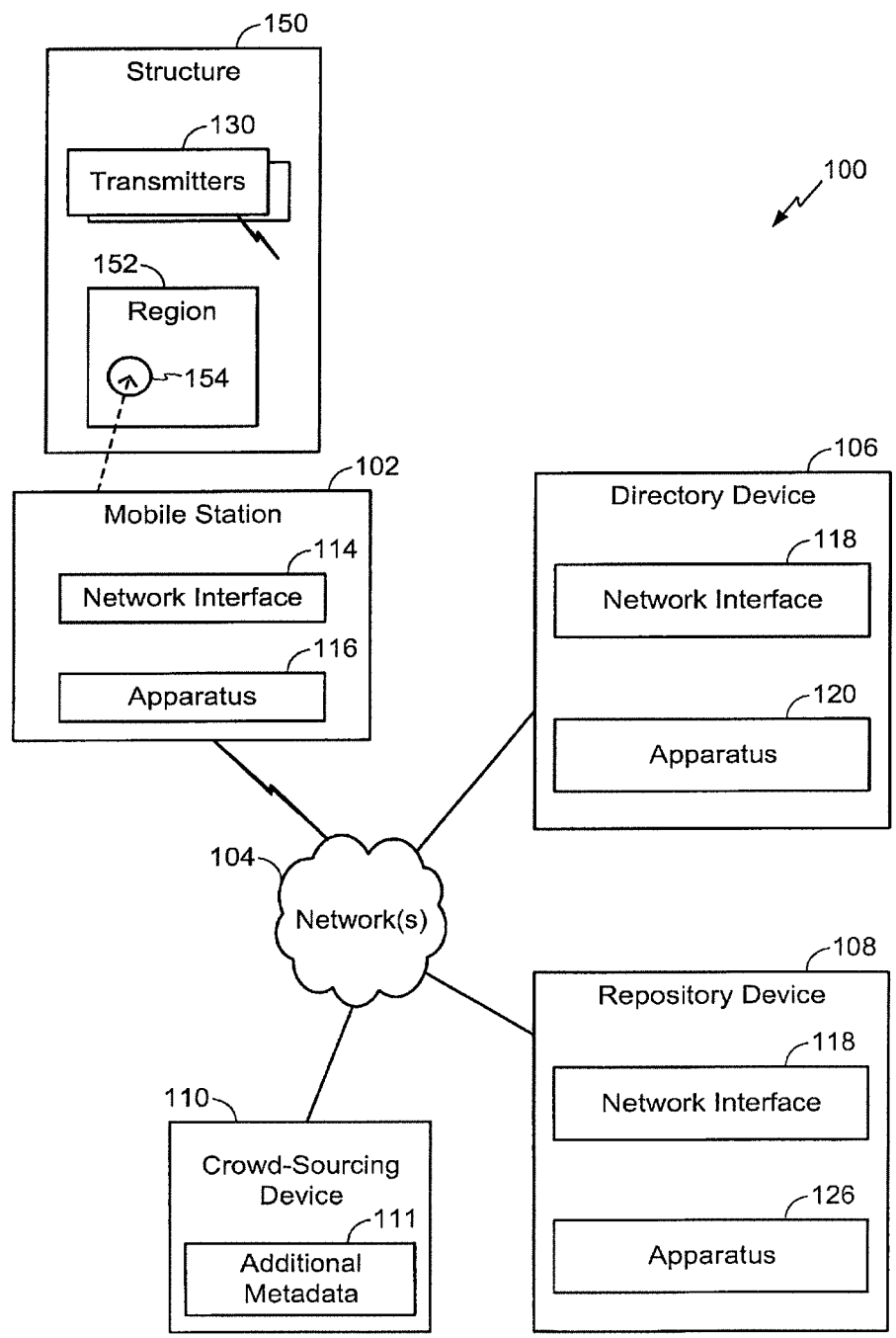
FIG. 1 is a schematic block diagram illustrating an example environment that includes a mobile station and other devices capable of communicating with one another over a network, in accordance with an implementation.

As described in greater detail herein, various methods and apparatuses are provided which may be implemented in various devices to derive, compute or otherwise generate positioning assistance data and/or the like at a mobile station for use by the mobile station in performing navigation operations in at least one of a plurality of different indoor regions.

In particular indoor navigation applications, a mobile device may perform positioning operations by use of "assistance data" received from an external entity over a communication network. Such assistance data may include, for example, a digital map of an area, locations of transmitters (e.g., for use in obtaining position fixes by ranging), heatmap data (e.g., having expected received signal characteristics at discrete points in an indoor area), a routeability graph expressing routing constraints based upon navigable paths or areas, just to name a few examples. Under this particular model, external entities providing assistance data may precompute assistance data such as, for example, digital maps, routeability graphs, heatmap data, just to name a few examples. This particular model, however, typically involves cooperation of multiple parties with complex contractual arrangements. For example, this particular model may rely on contractual arrangements between or among venue operators, third parties that generate positioning assistance data offline and mobile device manufacturers, for example.

By way of initial example, a method may be implemented at a mobile station to derive or compute positioning assistance data with regard to at least one of a plurality of different indoor regions based, at least in part, on descriptions or characterizations of the regions from at least one repository device. As part of such an example method, a mobile station may initially contact a directory device which may be able to inform the mobile station as to particular repository device(s) that the mobile station may contact to obtain applicable descriptions or characterizations of an environment of an indoor region of interest. For example, a mobile station may transmit a request for one or more repository device identifiers to a directory device. Such a request may, for example, being indicative of at least a first estimated location of the mobile station, e.g., identify or hint at a rough or general location. For example, a mobile station may indicate its last known estimated location, or other information that may infer or relate to its current location or surroundings.

A mobile station may then receive a response from the directory device that identifies at least one repository device. The response may also identify at least one indoor region corresponding to the first estimated location, e.g., via the specific repository identifier, and/or possibly via other additional identifying information. For example, a Uniform Resource Locator (URL) or other like unique address/identifier may be provided for a repository device, and a location context identifier (LCI) and/or other like unique identifier may be provided with regard to an indoor region.

A mobile station may then transmit a request for descriptions or characterizations of the environment of the indoor region to a repository device. In response to such a request, a mobile station may receive documents or files describing or characterizing the environment for use in computing, deriving or otherwise generating positioning assistance data. The mobile station may then apply the computed, derived or otherwise generated positioning assistance data in performing operations to provide a location based service to a user while in or around the indoor region. For example, the mobile station may derive an electronic map or an access point locator for use in various operations to be performed by the mobile station such as, for example, positioning, navigation, and other location based service operations. In certain instances, it may be beneficial for the mobile station to compute or derive positioning assistance data to comprise encoded metadata for at least a portion an indoor region, and which may, for example, correspond to an electronic map and/or an access point locator. For example, encoded metadata may comprise routing and/or feasibility parameters, point of interest (POI) features, etc., which may be useful in navigating an indoor region.

In one implementation, a mobile station may receive a description or characterization of an environment of a region in any one of several different types of formats. In one example, a mobile station may receive such description or characterization of an environment as documents in a markup language such as XML, GML, KML, cityML, etc. In another example, a mobile station may receive such description or characterization of an environment as documents in the form of one or more vector maps such as vector maps expressed in a CAD file or document. In yet another example, a mobile station may receive such description or characterization of an environment as documents in the form of one or more raster maps expressed in a JPEG or bitmap document. It should be understood, however, that these are merely examples of formats in which a description or characterization of an environment may be received by a mobile station and claimed subject matter is not limited in this respect.

In one implementation, a description or characterization of an environment may include, for example, a description or characterization of features such as walls, obstructions or locations of wireless transmitters in the environment. Examples of such wireless transmitters may include, for example, WLAN access points, Bluetooth devices, beacons, audio transmitters, just to identify a few examples. It should be understood, however, that these are merely particular examples of features which may at least in part characterize or describe an environment of a region and that claimed subject matter is not limited in this respect.

Accordingly, in certain example implementations, a mobile station may then compute, derive or otherwise generate applicable positioning assistance data from characterizations or descriptions of an environment of an indoor region received from one or more repository devices. In one particular implementation, positioning assistance data computed, derived or otherwise generated by a mobile station may include one or more of a signal heatmap (e.g., with expected signatures of RSSI and RTT at discrete location points in a region), probability map, routing graph, connectivity graph or feasibility graph, just to name a few examples. It should be understood, however, that these are merely examples of positioning assistance data that may be computed, derived or otherwise generated at a mobile station, and that claimed subject matter is not limited in this respect.

Positioning assistance data computed, derived or otherwise generated by a mobile station may comprise, at least in part, encoded metadata for at least a portion of the indoor region. The mobile station may, for example, decode or otherwise process the encoded metadata (if needed) and provide at least a portion of the resulting "decoded" metadata to at least one function. In certain example implementations, at least a portion of the encoded metadata may be established, at least in part, by an analyzer capability that may be provided, in whole or part, by the mobile device.

In certain example implementations, a mobile station may further determine a second estimated location, e.g., within an indoor region based, at least in part, on positioning assistance data computed, derived or otherwise generated by the mobile station. For example, a positioning function or navigation function may determine a more accurate location estimate based on signal measurements and radio models or heatmaps, etc., as may be provided in generated positioning assistance data (e.g., in an access point locator).

In certain example implementations, a mobile station may interface with other devices. For example, a mobile station may transmit collected data relating to an indoor region to a crowd-sourcing device and/or the like. For example, a mobile station may receive additional or updated description or characterization of an environment of an indoor region from a crowd-sourcing device and/or the like, which may be used for deriving, computing or otherwise generating positioning assistance data at the mobile station.

A directory device may, for example, receive a request for a repository device identifier from a mobile station, and which indicates in some manner at least a rough location of the mobile station. A directory device may then, for example, determine that the rough location corresponds to at least a portion of at least one indoor region, and transmit at least one repository device identifier for an applicable repository device to the mobile station.

With this above examples in mind, in accordance with another aspect, a method may be implemented by a mobile station. For example, a mobile station may obtain descriptions or characterizations of at least a portion of at least one indoor region. A repository device may, for example, receive a request for descriptions or characterizations of an environment of at least one indoor region from the mobile station. In response to the received request, the repository device may transmit at least a portion of applicable descriptions or characterizations of the environment (e.g., documents describing or characterizing structural features, transmitters located in or transmitting in the indoor region) to the requesting mobile station. Here, for example, such transmitted characterizations or descriptions may comprise, for example, descriptions or characterizations of map features (e.g., including obstructions and boundaries) and of transmitters located in or transmitting in an indoor region of interest.

In certain example instances, a repository device may obtain additional or updated description or characterization of an environment of an indoor region from a crowd-sourcing device and/or the like, and establish at least portions of descriptions or characterizations of an environment of an indoor region provided to a mobile station based, at least in part, on the additional or updated description or characterization.

In certain example instances, a repository device may provide at least a portion of a characterization or description of an environment of an indoor area as at least one venue diagram for the indoor region. Such a venue diagram may comprise, for example, a computer aided design (CAD) diagram and/or other like file(s). In other examples, as indicated above, a venue diagram may be expressed in a markup language document (e.g., XML, GML, KML, cityML, etc.) or in the form of a raster map (e.g., JPEG or bitmap). Upon receipt of such a venue diagram on request, a mobile station may process the venue diagram to extract map features for use in constructing an electronic map and/or all or portion of an access point locator.

As used herein the term "structure" may, for example, apply to (all or part of) one or more natural and/or man-made physical arrangements of object(s), the knowledge of which may be of use to a user of mobile station. For example, a structure may comprise all or part of a building that a user of a mobile station may enter into, exit from, and/or otherwise move about within. Some example structures may comprise a mixture of indoor and outdoor spaces.

As used herein the term "region" may, for example, relate to all or part of a structure that may be distinguished in some manner. In certain instances, for example, two or more different regions may be distinguished from one another based, at least in part, on various physical arrangements of objects, e.g., floors, ceilings, decks, walls, staircases, elevators, walkways, etc. Thus, for example, two or more regions of a structure may relate to two or more different levels (e.g., floors) of a building, two or more office suites in a building, stores in a shopping mall, etc.

FIG. 1 is a schematic block diagram illustrating an example environment 100 that includes a mobile station 102 and other devices for use in enabling mobile station 102 to compute, derive or otherwise generate positioning assistance data applicable to at least one of a plurality of different regions 152 (e.g., indoor regions), in accordance with an implementation. Mobile station 102 may then apply the computed, derived or otherwise generated positioning assistance data in performing navigation operations in the at least one of a plurality of different regions 152.

By way of example, mobile station 102 may comprise any electronic device that may be moved about by a user within a structure and which comprises a network interface 114 for receiving signals transmitted by transmitters 130 (e.g., access points, cell towers, broadcast transmitters, Bluetooth devices, etc.) and/or other resources in network(s) 104, etc. Thus, by way of some examples, mobile station 102 may comprise a cell phone, a smart phone, a computer (e.g., a personal computer such as a laptop computer, a tablet computer, a wearable computer, etc.), a navigation aid, a digital book reader, a gaming device, a music and/or video player device, a camera, etc.

Apparatus 116 is representative of circuitry, such as, e.g., hardware, firmware, a combination of hardware and software, and/or a combination of firmware and software or other like logic that may be provided in mobile station 102 for use in deriving, computing or otherwise generating positioning assistance data. Apparatus 116 may then also be used for applying the derived, computed or otherwise generated positioning assistance data in performing navigation operations.

In certain example implementations, mobile station 102 may function exclusively or selectively as a stand-alone device, and may provide one or more capabilities/services of interest/use to a user. In certain example implementations, mobile station 102 may communicate in some manner with one or more other devices, for example, as illustrated by the wireless communication link to the cloud labeled network(s) 104. Network(s) 104 may be representative of one or more communication and/or computing resources (e.g., devices and/or services) which mobile station 102 may communicate with or through, e.g., via network interface 114 using one or more wired or wireless communication links. Thus, in certain instances mobile station 102 may receive (or send) data and/or instructions via network(s) 104. In certain instances, mobile station 102 may, for example, not only receive a signal from a transmitter 130, but may also transmit a signal to a receiver co-located with a transmitter (e.g., having a receiver).

In certain example implementations, mobile station 102 may be enabled to receive signals associated with one or more wireless communication networks, location services, and/or the like or any combination thereof which may be associated with one or more transmitters 130 and/or network(s) 104.

Mobile station 102 may, for example, be enabled (e.g., via network interface 114) for use with various wireless communication networks such as a wireless wide area network (WWAN), a wireless local area network (WLAN), a wireless personal area network (WPAN), and so on. The term "network" and "system" may be used interchangeably herein. A WWAN may be a Code Division Multiple Access (CDMA) network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, and so on. A CDMA network may implement one or more radio access technologies (RATs) such as cdma2000, Wideband-CDMA (W-CDMA), Time Division Synchronous Code Division Multiple Access (TD-SCDMA), to name just a few radio technologies. Here, cdma2000 may include technologies implemented according to IS-95, IS-2000, and IS-856 standards. A TDMA network may implement Global System for Mobile Communications (GSM), Digital Advanced Mobile Phone System (D-AMPS), or some other RAT. GSM and W-CDMA are described in documents from a consortium named "3rd Generation Partnership Project" (3GPP). Cdma2000 is described in documents from a consortium named "3rd Generation Partnership Project 2" (3GPP2). 3GPP and 3GPP2 documents are publicly available. A WLAN may include an IEEE 802.11x network, and a WPAN may include a Bluetooth network, an IEEE 802.15x, for example. Wireless communication networks may include so-called next generation technologies (e.g., "4G"), such as, for example, Long Term Evolution (LTE), Advanced LTE, WiMAX, Ultra Mobile Broadband (UMB), and/or the like.

In certain example implementations, mobile station 102 may be enabled (e.g., via network interface 114 or other location receiver) for use with various location service(s), such as, a Global Navigation Satellite System (GNSS), or other like satellite and/or terrestrial locating service, a location based service (e.g., via a cellular network, a WiFi network, etc.).

As illustrated in FIG. 1, mobile station 102 may be located at a location 154 in a region 152 of a structure 150. By way of example, positioning assistance data may be processed and/or otherwise presented or used in some manner by mobile station 102 to assist in supporting one or more functions, e.g., positioning or navigation functions, as a user moves with mobile station within and/or nearby structure 150 and/or region 152.

An example directory device 106 is illustrated as being connected to network(s) 104 via a network interface 118, which in certain implementations may be similar to network interface 114. Directory device 106 may, for example, comprise one or more computing platforms, e.g., servers, etc., which may provide an apparatus 120. As previously mentioned and further illustrated in subsequent examples, apparatus 120 may process requests for information received via network interface 118 (e.g., from mobile station 102) and initiate transmission of responses thereto. Here, requests for location or identification of a resource on a network may be transmitted to directory device 106 and directory device 106 may respond with an identifier, address, or the like, which may be subsequently used by mobile station 102 to query the resource for obtaining desired information.

Example repository device 108 is illustrated as being connected to network(s) 104 via its network interface 118, which in certain implementations may be similar to network interface 114. Repository device 108 may, for example, comprise one or more computing platforms, e.g., servers, etc., which may provide an apparatus 126. As previously mentioned and further illustrated in subsequent examples, apparatus 126 may also process requests for information received via network interface 118 and initiate transmission of responses thereto. As illustrated, apparatus 126 may, for example, establish, maintain, or store documents or files which describe or characterize aspects of an environment of a region of interest (e.g., region 152). The implementation shown in FIG. 1 shows a single repository device 108. It should be understood, however, that other implementations may include multiple repository devices which are individually accessible through a communication network.

Also illustrated in FIG. 1, is an example, crowd-sourcing device 110, which may, for example, comprise one or more computing platforms, e.g., servers, etc., and may establish, maintain, or store metadata 111, and/or provide such to other devices and/or mobile station 102, e.g., via network(s) 104.

Figure 2:
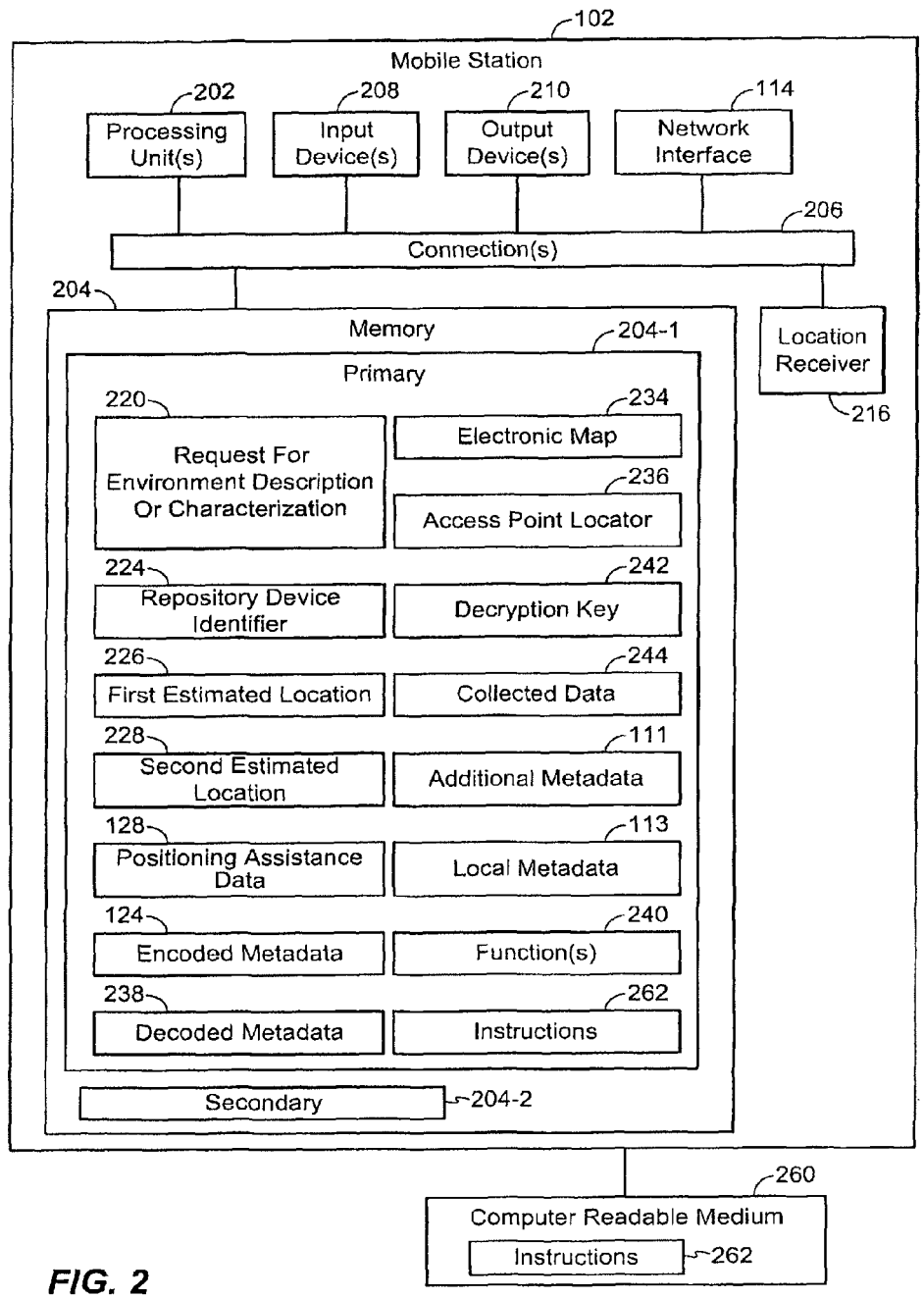
FIG. 2 is a schematic block diagram illustrating certain features of an example mobile station, in accordance with an implementation.

FIG. 2 is a schematic block diagram illustrating certain features of an example mobile station 102 for use in computing, deriving or otherwise generating positioning assistance data 128, and applying the computed, derived or otherwise generated positioning assistance data in providing a navigation service, in accordance with an implementation.

As illustrated mobile station 102 may comprise one or more processing units 202 to perform data processing (e.g., in accordance with the techniques provided herein) coupled to memory 204 via one or more connections 206. Processing unit(s) 202 may, for example, be implemented in hardware or a combination of hardware and software. Processing unit(s) 202 may be representative of one or more circuits configurable to perform at least a portion of a data computing procedure or process. By way of example but not limitation, a processing unit may include one or more processors, controllers, microprocessors, microcontrollers, application specific integrated circuits, digital signal processors, programmable logic devices, field programmable gate arrays, or the like, or any combination thereof.

Memory 204 may be representative of any data storage mechanism. Memory 204 may include, for example, a primary memory 204-1 and/or a secondary memory 204-2. Primary memory 204-1 may comprise, for example, a random access memory, read only memory, etc. While illustrated in this example as being separate from the processing units, it should be understood that all or part of a primary memory may be provided within or otherwise co-located/coupled with processing unit(s) 202, or other like circuitry within mobile station 102. Secondary memory 204-2 may comprise, for example, the same or similar type of memory as primary memory and/or one or more data storage devices or systems, such as, for example, a disk drive, an optical disc drive, a tape drive, a solid state memory drive, etc. In certain implementations, secondary memory may be operatively receptive of, or otherwise configurable to couple to, computer readable medium 260. Memory 204 and/or computer readable medium 260 may comprise instructions 262 associated with data processing, e.g., in accordance with the techniques and/or apparatus 116 (FIG. 1), as provided herein.

Mobile station 102 may, for example, further comprise one or more user input devices 208, one or more output devices 210, one or more network interfaces 114, and/or one or more location receivers 216.

Input device(s) 208 may, for example, comprise various buttons, switches, a touch pad, a trackball, a joystick, a touch screen, a microphone, a camera, and/or the like, which may be used to receive one or more user inputs. Output devices 210 may, for example, comprise various devices that may be used in producing a visual output, an audible output, and/or a tactile output for a user.

A network interface 114 may, for example, provide connectivity to one or more transmitters 130 and/or network(s) 104 (FIG. 1), e.g., via one or more wired and/or wireless communication links. Location receiver 216 may, for example, acquire signals in support of one or more location services, which may be used in estimating a location that may be provided to or otherwise associated with one or more signals stored in memory. For example, a location receiver may be used to estimate a first location that may indicate (possibly roughly) that mobile station 102 is at or nearby, or possibly approaching a particular structure/region.

Processing unit(s) 202 and/or instructions 262 may, for example, provide or otherwise be associated with one or more signals stored in memory 204, such as, one or more requests for a repository device identifier 220, one or more requests for descriptions or characterizations of environments covering a region (e.g., documents depicting maps or characterizations of transmitters located in or transmitting the region), one or more repository device identifiers 224, a first estimated location 226, a second estimated location 228, positioning assistance data 128, encoded metadata 124, decoded metadata 238, one or more electronic maps 234, one or more access point locators 236, one or more decryption keys 242, collected data 244, additional metadata 111, local metadata 113, instructions and/or data for or supportive of one or more functions 240 and/or the like or any combination thereof, e.g., as described in the various example techniques herein.

Figure 3:
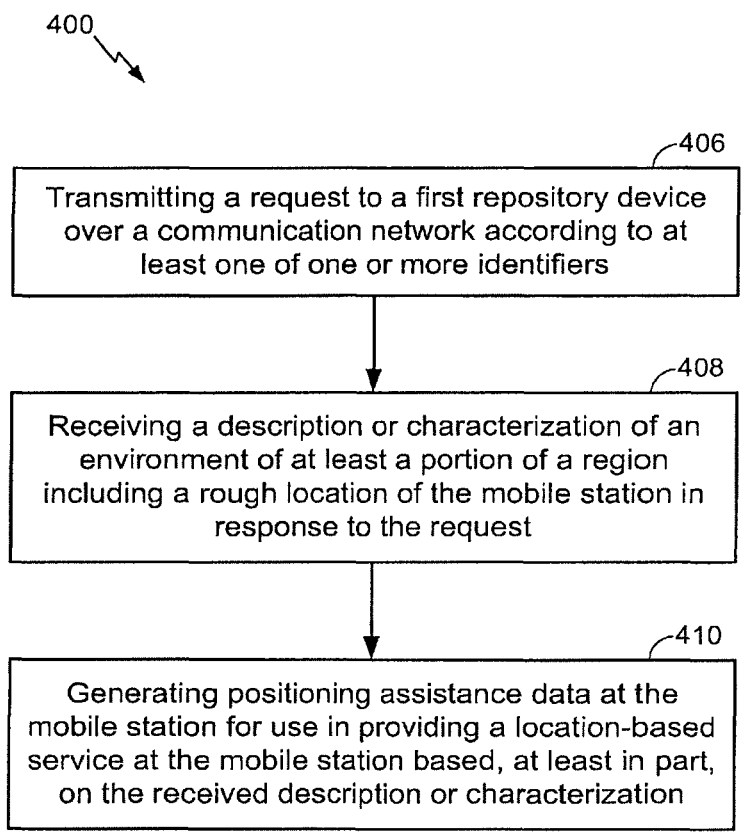
FIG. 3 is a flow diagram of a process of deriving or computing positioning assistance data at a mobile station for use in positioning operations by the mobile station, in accordance with an implementation.

FIG. 3 is a flow diagram illustrating certain features of an example process or method 400 for a mobile station 102 to derive, generate or compute positioning assistance data 128 and/or the like with regard to at least one of a plurality of different indoor regions, in accordance with an implementation. In one implementation, mobile station 102 may obtain one or more identifiers directed to a repository device such as a repository device identifier 224 identifying repository device 108 and at least one indoor region corresponding to an estimated location 226 of mobile station 102 (e.g., based, at least in part, on the indication of the rough location). Here, in a particular implementation, mobile station 102 may receive repository device identifier 224 by first transmitting a request to directory device 106 including at least an indication of a rough location of mobile station 102, and receiving repository device identifier 224 in response to the request. Alternatively, mobile station 102 may already have repository device identifier 224 stored in memory (e.g., entered by a user, downloaded at an earlier time, etc.). Mobile station 102 may then receive an indication of a rough location (e.g., as entered by the user or from other clues/hints such as from locally acquired wireless signals, sensor measurements, etc.), and transmit the indication rough location to repository device 108 according to a pre-stored repository device identifier 224. In a particular implementation, repository device identifier may 224 include one or more universal resource identifiers (URIs) or universal resource locators (URLs). At block 406, mobile station 102 may transmit a request to a repository for device (e.g., addressed according to or based on repository device identifier received at block 404) for descriptions or characterizations of an environment of a region including the rough location. At block 406, in a particular implementation, multiple requests may be transmitted to multiple different repository devices according to different identifiers. For example, one request may be made to a first repository device for a description or characterization of transmitters while located in a transmitting in a second request may be made to a second repository device for a map of the region in a common format. At block 408, mobile station 102 may receive descriptions or characterizations of an environment in response to requests transmitted at block 406. Based, at least in part on descriptions or characterizations received at block 408, mobile station 102 at block 410 may then compute, derive or otherwise generate positioning assistance data at mobile station 102. As discussed below in a particular implementation with reference to FIG. 5, this may include analyzing descriptions or characterizations and related inferences.

Figure 4:
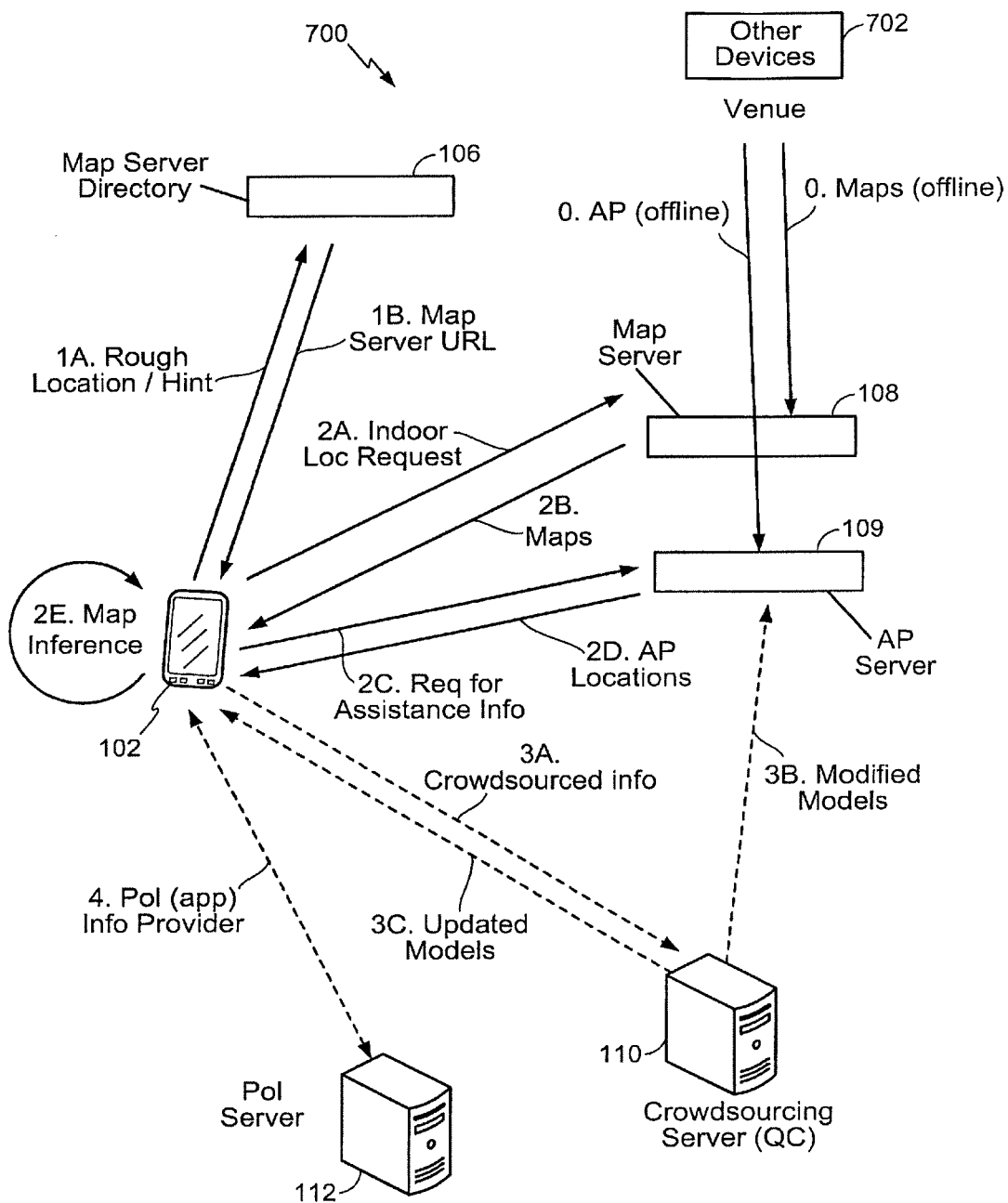
FIG. 4 is a flow diagram illustrating certain features of an example process or method for transmission of messages in a communication network to enable a mobile station to compute positioning assistance data, in accordance with an implementation.

FIG. 4 is a schematic block diagram illustrating an example communication session 700 that may be implemented in an example environment to enable mobile station 102 to derive, compute or otherwise generate positioning assistance data and/or the like for use by mobile station 102 in navigation operations, in accordance with an implementation. Here, FIG. 4 may illustrate a specific and non-limiting implementation of the system illustrated in FIG. 1. Other devices 702 may comprise computing platforms 300 or the like connected to network(s) 104, which may generate or otherwise provide various forms of descriptions or characterizations of a local environment such as, for example, maps, diagrams, etc., transmitter descriptions or characterizations (e.g., access point (AP) locations and MAC addresses), that may then be stored in an accessible format at a repository device 108 (e.g., Map server or AP server). Arrows with text are also shown in FIG. 4, which provide some examples of messages/information that may be communicated between the various devices, e.g., in accordance with example communication session 700.

As shown, example communication session 700 may include obtaining information from a venue, via one or more messages #0 between other devices 702 and one or more repository device 108 (shown here as a "Map Server" and/or "AP Sever"). With one or more messages #1A, #1B between mobile station 102 and directory device 106 (shown here as a "Map Sever Directory"), mobile station 102 may use its rough location (e.g., first estimated location 226) to learn from the Map Server Directory a specific device or resource to communicate with for obtaining descriptions or characterizations of a local environment. With one or more messages #2A, #2B between mobile station 102 and an applicable repository device 108 (Map or AP Server), mobile station 102 may use its rough location and/or other information from directory server 106 to access descriptions or characterizations of the local environment.

With one or more messages #3A, #3C between mobile station 102 and a crowd-sourcing device 110 (shown here as a "Crowdsourcing Server"), mobile station 102 may provide collected data 244 and/or receive additional metadata 111. Here, for example, collected data may include crowdsourced information and/or measurements that may be gathered or otherwise collected by mobile station 102, e.g., via one or more circuits, applications, user interfaces, etc. Additional metadata 111 may, for example, comprise metadata similar to encoded data but which has been derived, updated or otherwise modified based, at least in part, on information obtained by or others generated within crowd-sourcing device 110. For example, crowd-sourcing device 110 may make use of collected data from one or more mobile stations to update/correct existing AP locations, radio models, heat-maps, etc. As further shown, one or more messages #3B between crowd-sourcing device 110 and repository device 108 may be provided, e.g., for similar or other like purposes.

Further, in this example, one or more messages #4 between mobile station 102 and a local device 112 (shown here as a "POI Server") may be used to provide local metadata 113 and/or the like to mobile station 102, e.g., an indoor position of the mobile station may be used to trigger or otherwise obtain applicable POI information and services (e.g., location based services, etc.).

Figure 5:
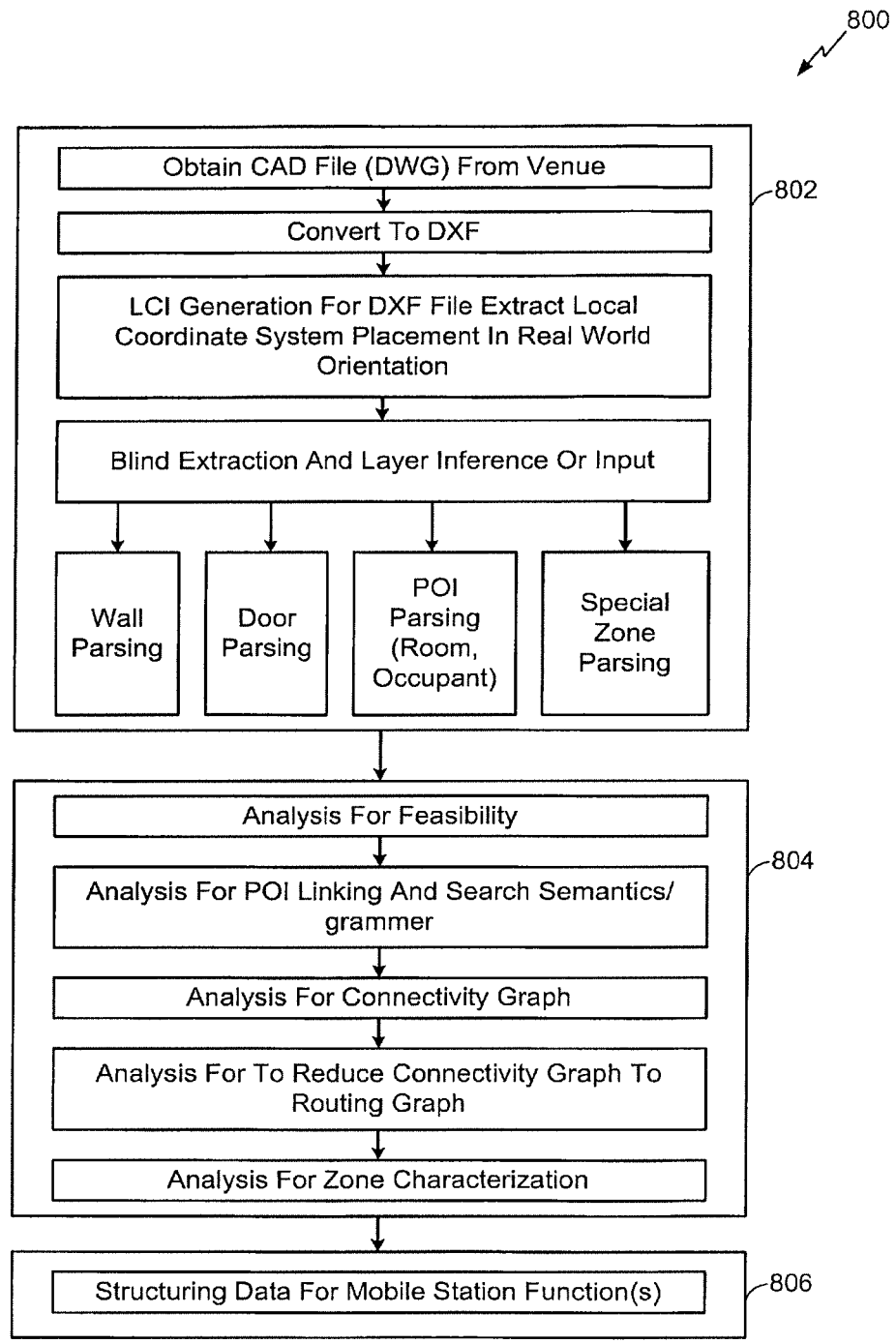
FIG. 5 is a flow diagram illustrating certain features of example processes or methods to establish an electronic map via a map extraction phase, establish encoded metadata via a map inference phase of an analyzer capability, and configure positioning assistance data for use by a mobile station, in accordance with an implementation.

FIG. 5 is a flow diagram illustrating certain features of some example processes or methods 800 performed at mobile station 102 to establish an electronic map via a map extraction phase 802, establish encoded metadata via a map inference phase 804, and configure positioning assistance data 128 for use by mobile station 102, in accordance with an implementation.

In a particular implementation, a description or characterization of an environment may include structure and/or region diagrams which are often owned, controlled, or otherwise maintained by some entity or person associated with a particular venue. Some structure and/or region diagrams that may be provided for a venue may include embedded information about certain features and/or objects within a region. By way of example, some diagrams may provide a level of accuracy and detail that may be available in CAD diagrams or the like. Thus, assuming that the diagrams (maps) are available in an appropriate CAD format (e.g., drawing exchange format (DXF), etc.), they may be received and processed by mobile station 102 (e.g., at message 2B) into a useful electronic format.

Repository device 108, as a Map Server may, for example, host one or more map descriptions of one or more LCIs, regions, structures, venues, etc. Repository device 108 may, for example, aggregate map descriptions of many different LCIs. Hence, a scale and possibly ownership of such a Map Server may vary significantly. On one hand, a single entity (e.g., associated with an office building, or a mall) may host a repository device 108. In other examples, an entire campus or enterprise may host all their various maps on a single repository device 108. In still other example implementations, a third party may provide for a central repository device 108 for a wide number of venues. It should be noted that the various techniques provided herein may be implemented in various manners, including architectures that may be essentially agnostic to a scale of a map server.

Map extraction phase 802 may, for example, be performed at mobile device 102 in a particular implementation. In example map extraction phase 802, a CAD file may be analyzed to identify and extract relevant features expressed in its many layers. Relevant features may include, for example, walls, doors and entry/exit points. This analysis may also identify special zones like portals (e.g., elevators, escalators, stairs). Also, some POI features (e.g., indication of a type of room such as the word "restroom") available in the CAD files may be extracted. Such extraction techniques and others are known and beyond the scope of this description. Moreover, subject matter claimed herein is not necessarily limited to any particular extraction techniques. Map inference phase 804 may also be performed at mobile station 102 in a particular implementation. With map inference phase 804, certain features of a map may be analyzed, e.g., by a suite of processes, to determine or derive useful metadata indicating extracted features of the map. For example, as part of map inference phase 804, analysis may be performed as to a user's movement/access feasibility and/or infeasibility with respect to various parts of a map (e.g., and objects in a region represented thereby). In certain example instances, a dense connectivity graph may be determined, e.g., that may be utilized by a positioning function for accurate positioning, etc. In certain example instances, a connectivity graph may be determined and/or possibly reduced to form a routing graph, for use in navigation functions, and/or for other like purposes. In certain example instances, a probability map of a region maybe determined, e.g., based on routes, etc. for use in particle filtering applications, for example. In certain example instances, radio heatmaps or other like RF signal related information associated with a region expressing, among other things, probabilities of transitions between nodes in a routing graph, may be determined, e.g., through map analysis and availability of known transmitter locations. In certain example instances, various points of interest may be linked or otherwise identified, e.g., based on determined relationships, etc. Here, semantic inferences may be drawn from labels or descriptions in a CAD file associated with a POI for deriving metadata annotations to the POI in a electronic map to be displayed on the mobile station 102.

In certain example implementations, it may be beneficial to have both map features and characterizations of transmitters in map inference phase 804. Various like map inference techniques and others are known and beyond the scope of this description. Moreover, subject matter claimed herein is not necessarily limited to any particular map inference techniques. As discussed above, in particular implementations aspects of map extraction phase 802 and map inference phase 804 may be both performed at a mobile station as part of a process for generating positioning assistance data for use by mobile station 102. In alternative implementations, all or portions map extraction phase 802 may be performed a remote device (e.g., a server or repository device) while map inference phase 804 is performed at mobile station 102. Here, for example, mobile station 102 may receive extracted features from a description or characterization of an environment (e.g., map features) from a remote server through a communication network, and then perform inference phase 804 based on the received extracted map features.

In certain example implementations, an access point locator may include radio models, radio heatmaps, and/or other like characterizations of a local RF signal environment of a region. In certain instances, it may be beneficial not include exact AP or transmitter locations in an access point locator. Radio heatmaps (e.g. RSSI heatmaps) may, for example, be expressed as expected received signal strengths at various points in a region.

In certain example implementations, a first estimated location may be provided, at least in part, using a last known GPS fix, identifying WiFi access points being heard, or possibly via some text input from user or other sensed information (e.g., camera, scanner, microphone) that may possibly indicate or hint at a rough current location.

In certain example implementations, a directory device 106 may provide some assistance data to a mobile station, e.g., by determining one or more nearby LCI(s), e.g., by looking such up in a database, etc.

In certain example implementations, map structuring phase 806 may establish encoded metadata 124 suitable for display, use and/or the like by mobile station 102. In certain instances, all or part of map structuring phase 806 may be performed to take advantage of various forms of specific encoding, data compression, and/or data encryption techniques. In particular implementations, all or part of map structuring phase 806 may be performed along with similar actions regarding other data that may be included in positioning assistance data 128. For example, map structuring phase 806 may express extracted map features (e.g., extracted from a CAD file) in a format suitable for presentation in an electronic map on a display device of a mobile station. POIs may be indicated in the electronic map through annotations of metadata obtained from POI parsing, etc. Various data processing and conversion, techniques and others are known and beyond the scope of this description. Moreover, subject matter claimed herein is not necessarily limited to any particular data formatting techniques.

The methodologies described herein may be implemented by various means depending upon applications according to particular features and/or examples. For example, such methodologies may be implemented in hardware, firmware, and/or combinations thereof, along with software. In a hardware implementation, for example, a processing unit may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other devices units designed to perform the functions described herein, and/or combinations thereof.

In the preceding detailed description, numerous specific details have been set forth to provide a thorough understanding of claimed subject matter. However, it will be understood by those skilled in the art that claimed subject matter may be practiced without these specific details. In other instances, methods and apparatuses that would be known by one of ordinary skill have not been described in detail so as not to obscure claimed subject matter.

Some portions of the preceding detailed description have been presented in terms of algorithms or symbolic representations of operations on binary digital electronic signals stored within a memory of a specific apparatus or special purpose computing device or platform. In the context of this particular specification, the term specific apparatus or the like includes a general purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and generally, is considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated as electronic signals representing information. It has proven convenient at times, principally for reasons of common usage, to refer to such signals as bits, data, values, elements, symbols, characters, terms, numbers, numerals, information, or the like. It should be understood, however, that all of these or similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining", "establishing", "obtaining", "identifying", and/or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device. In the context of this particular patent application, the term "specific apparatus" may include a general purpose computer once it is programmed to perform particular functions pursuant to instructions from program software.

The terms, "and", "or", and "and/or" as used herein may include a variety of meanings that also are expected to depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein may be used to describe any feature, structure, or characteristic in the singular or may be used to describe a plurality or some other combination of features, structures or characteristics. Though, it should be noted that this is merely an illustrative example and claimed subject matter is not limited to this example.

While there has been illustrated and described what are presently considered to be example features, it will be understood by those skilled in the art that various other modifications may be made, and equivalents may be substituted, without departing from claimed subject matter. Additionally, many modifications may be made to adapt a particular situation to the teachings of claimed subject matter without departing from the central concept described herein.

Therefore, it is intended that claimed subject matter not be limited to the particular examples disclosed, but that such claimed subject matter may also include all aspects falling within the scope of appended claims, and equivalents thereof.

What is claimed is:

1. A mobile station, comprising:
   a network interface to receive digital electronic signals transmitted over a communication network from a network device external to the mobile station; and
   a processor configured to:
      obtain, from the digital electronic signals, one or more documents comprising one or more first maps, the one or more first maps comprising one or more descriptions or characterizations of at least a portion of an environment;
      extract one or more features from the one or more descriptions or characterizations; and
      determine one or more annotations for at least one second map based, at least in part, on the one or more features extracted, wherein the one or more annotations comprise positioning assistance data, wherein the positioning assistance data comprises positioning determination assistance data, navigation determination assistance data, or a combination thereof, and the navigation determination assistance data comprises a routing graph, connectivity graph, feasibility graph, or a combination thereof.

2. The mobile station of claim 1, wherein the one or more descriptions or characterizations of at least a portion of the environment comprise at least one CAD file or document.

3. The mobile station of claim 1, wherein the one or more features extracted comprise walls, doors, entry/exit points, or a combination thereof.

4. The mobile station of claim 1, the processor to further determine one or more regions for which movement or access is feasible or infeasible based, at least in part, on the one or more features extracted.

5. The mobile station of claim 4, the processor to further determine a dense connectivity graph based, at least in part, on the determined one or more regions.

6. The method of claim 1, further comprising performing one or more navigation operations in at least one indoor region based, at least in part, on the positioning assistance data.

7. A mobile station comprising:
means for obtaining one or more documents comprising one or more first maps, the one or more first maps comprising one or more descriptions or characterizations, from digital electronic signals, of at least a portion of an environment, wherein the digital electronic signals are received from a network device external to the mobile station;
means for extracting one or more features from the one or more descriptions or characterizations; and
means for determining one or more annotations for at least one second map based, at least in part, on the one or more features extracted, wherein the one or more annotations comprise positioning assistance data, wherein the positioning assistance data comprises positioning determination assistance data, navigation determination assistance data, or a combination thereof, and the navigation determination assistance data comprises a routing graph, connectivity graph, feasibility graph, or a combination thereof.

8. The mobile station of claim 7, wherein the one or more features extracted comprise walls, doors, entry/exit points, or a combination thereof.

9. The mobile station of claim 7, further comprising means for determining one or more regions for which movement or access is feasible or infeasible based, at least in part, on the one or more features extracted.

10. The mobile station of claim 7, wherein the one or more descriptions or characterizations comprise descriptions or characterizations of one or more transmitters located within the at least a portion of the environment.

11. The mobile station of claim 10, further comprising means for computing a radio heatmap covering the at least a portion of the environment based, at least in part, on the descriptions or characterizations of the one or more transmitters.

12. A non-transitory storage medium having machine-readable instructions stored thereon which are executable by a special purpose computing apparatus of a mobile station to:
obtain one or more documents comprising one or more first maps, the one or more first maps comprising one or more descriptions or characterizations, from digital electronic signals, at least a portion of an environment from at least one repository device external to the mobile station;
extract one or more features from the one or more descriptions or characterizations; and
determine one or more annotations for at least one second map based, at least in part, on the one or more features extracted, wherein the one or more annotations comprise positioning assistance data, wherein the positioning assistance data comprises positioning determination assistance data, navigation determination assistance data, or a combination thereof, and the navigation determination assistance data comprises a routing graph, connectivity graph, feasibility graph, or a combination thereof.

13. The non-transitory storage medium of claim 12, wherein the machine-readable instructions are further executable by the special purpose computing apparatus to determine one or more regions for which movement or access is feasible or infeasible based, at least in part, on the one or more features extracted.

14. The non-transitory storage medium of claim 13, wherein the machine-readable instructions are further executable by the special purpose computing apparatus to determine a dense connectivity graph based, at least in part, on the determined one or more regions.

15. The non-transitory storage medium of claim 14, wherein the machine-readable instructions are further executable by the special purpose computing apparatus to reduce the dense connectivity graph into a routing graph.

16. The non-transitory storage medium of claim 12, wherein the machine-readable instructions are further executable by the special purpose computing apparatus to compute a radio heatmap covering the at least a portion of the environment based, at least in part, on descriptions or characterizations of the one or more transmitters.

17. A method comprising, at a mobile station:
processing, by a processor of the mobile station, digital electronic signals comprising one or more documents comprising one or more first maps, the one or more first maps comprising one or more descriptions or characterizations of at least a portion of an environment, wherein the digital electronic signals are received by the mobile station from a network device external to the mobile station;
extracting, by the processor, one or more features from the one or more descriptions or characterizations; and
determining, by the processor, one or more annotations for at least one second map based, at least in part, on the one or more features extracted, wherein the one or more annotations comprise positioning assistance data, wherein the positioning assistance data comprises positioning determination assistance data, navigation determination assistance data, or a combination thereof, and the navigation determination assistance data comprises a routing graph, connectivity graph, feasibility graph, or a combination thereof.

18. The method of claim 17, wherein the one or more descriptions or characterizations of at least a portion of the environment comprise at least one CAD file or document.

19. The method of claim 17, wherein the one or more features extracted comprise one or more of: walls, doors, or entry/exit points.

20. The method of claim 17, further comprising determining, by the processor, one or more regions for which movement or access is feasible or infeasible based, at least in part, on the one or more features extracted.

21. The method of claim 20, further comprising determining, by the processor, a dense connectivity graph based, at least in part, on the determined one or more regions.

22. The method of claim 21, further comprising reducing, by the processor, the dense connectivity graph into a routing graph.

23. The method of claim 22, further comprising determining, by the processor, a probability map based, at least in part, on the routing graph.

24. The method of claim 17, wherein the one or more descriptions or characterizations comprise descriptions or characterizations of one or more transmitters located within the at least a portion of the environment.

25. The method of claim 24, further comprising computing, by the processor, a radio heatmap covering the at least a portion of the environment based, at least in part, on the descriptions or characterizations of the one or more transmitters.

26. The method of claim 17, wherein the positioning determination assistance data comprises one or more of a signal heatmap or probability map.

* * * * *